United States Patent [19]
Tsugane et al.

[11] Patent Number: 5,657,370
[45] Date of Patent: Aug. 12, 1997

[54] CELLULAR PORTABLE RADIOTELEPHONE

[75] Inventors: Yoshiyuki Tsugane; Michio Nagai, both of Tokyo, Japan

[73] Assignee: NEC Corporation, Tokyo, Japan

[21] Appl. No.: 434,687

[22] Filed: May 4, 1995

[30] Foreign Application Priority Data

May 18, 1994 [JP] Japan .................. 6-103902

[51] Int. Cl.⁶ .................. H04M 11/00; H04M 1/00; H04B 1/38
[52] U.S. Cl. .................. 455/550; 379/433; 455/575
[58] Field of Search .................. 379/58, 59, 433, 379/428, 434, 437, 440, 447, 451; 455/89, 90

[56] References Cited

U.S. PATENT DOCUMENTS

| | | | |
|---|---|---|---|
| 4,926,474 | 5/1990 | Marks | 379/433 |
| 5,008,924 | 4/1991 | Guichard et al. | 379/433 |
| 5,177,784 | 1/1993 | Hu et al. | 379/433 |
| 5,197,091 | 3/1993 | Takagi et al. | 379/433 |
| 5,224,076 | 6/1993 | Thorp | 379/433 |
| 5,276,916 | 1/1994 | Pawlish et al. | 455/90 |
| 5,485,517 | 1/1996 | Gray | 379/433 |
| 5,491,507 | 2/1996 | Umezawa | 379/433 |

FOREIGN PATENT DOCUMENTS

| | | |
|---|---|---|
| 0 501 820 | 9/1992 | European Pat. Off. . |
| 0 535 903 | 4/1993 | European Pat. Off. . |
| 0 647 037 | 4/1995 | European Pat. Off. . |
| 3836406 | 5/1990 | Germany . |
| 5369796 | 5/1996 | Germany . |
| 4-117848 | 4/1992 | Japan . |
| 4-273744 | 9/1992 | Japan . |
| WO94/13088 | 6/1994 | WIPO . |

*Primary Examiner*—Curtis Kuntz
*Assistant Examiner*—Binh K. Tieu
*Attorney, Agent, or Firm*—Young & Thompson

[57] ABSTRACT

A cellular portable radiotelephone including a first housing having at least a telephone receiving section, and a second housing slidably and pivotally mounted to the first housing and capable of being housed in the first housing, the second housing having a front surface, a rear surface serving as a slide surface to slide on the first housing, and a key operating section, wherein a display is disposed on the first or second housing, and a telephone transmitting section is disposed on the second housing.

20 Claims, 13 Drawing Sheets

FIG. 2A PRIOR ART
FIG. 2B PRIOR ART
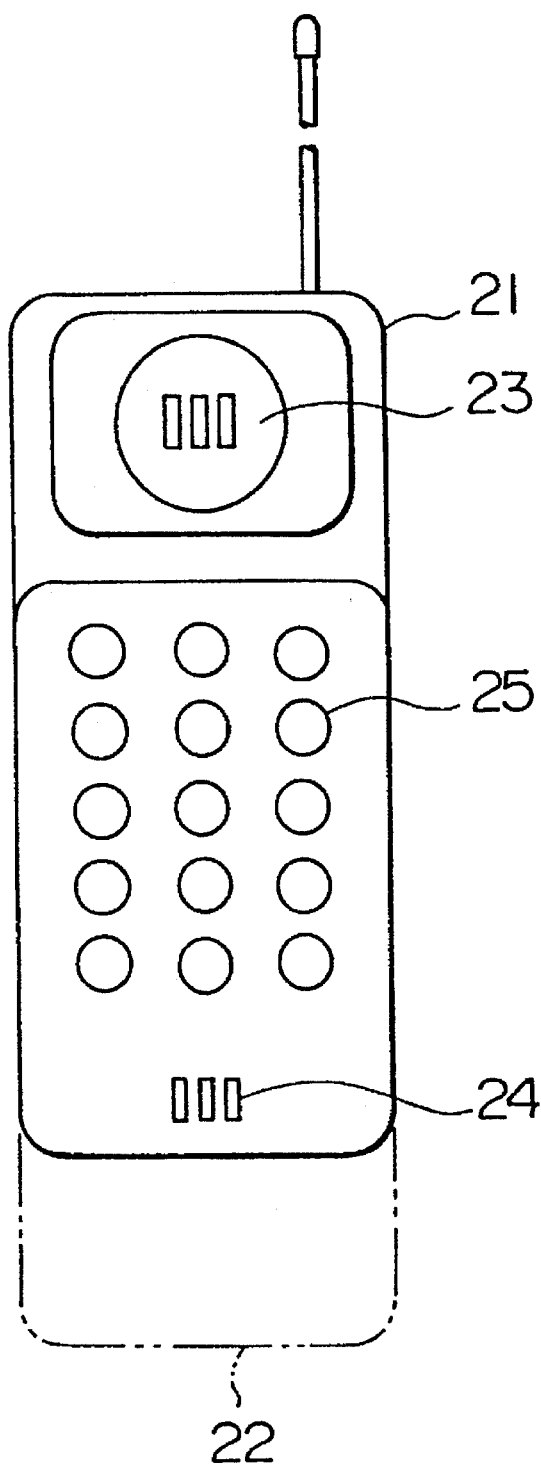
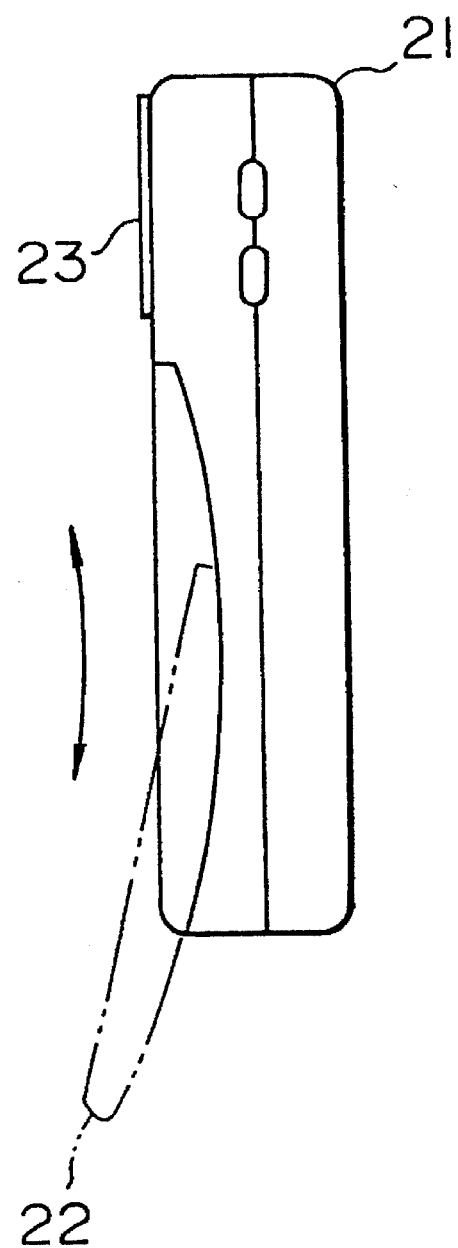

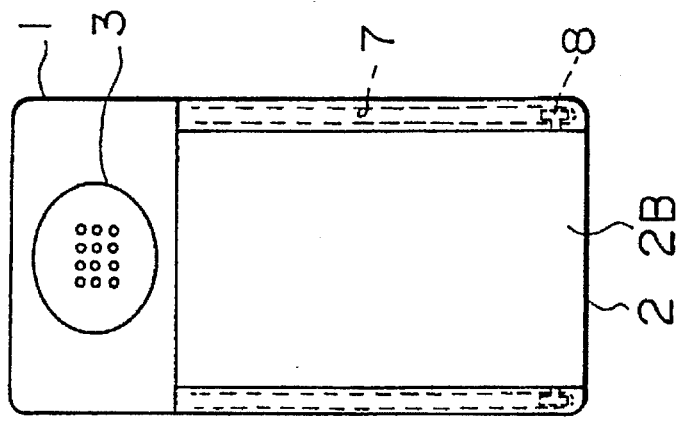
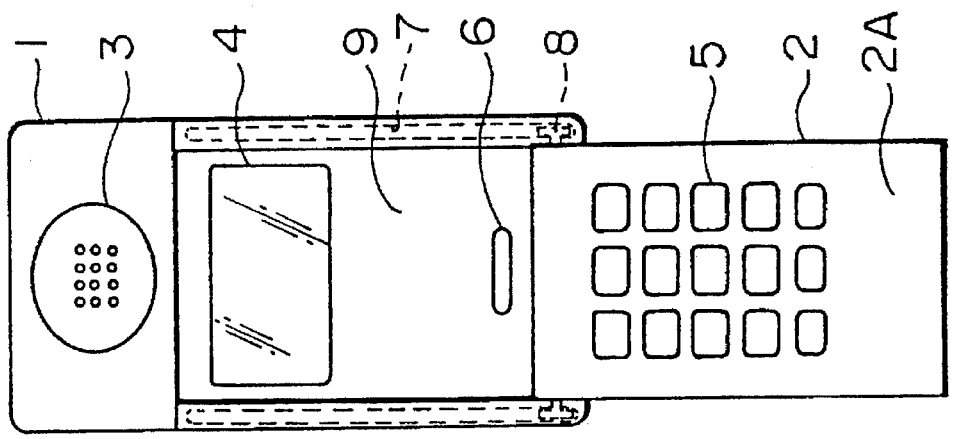
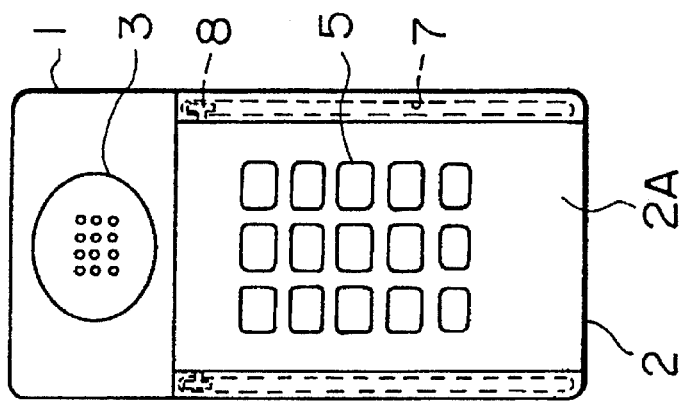

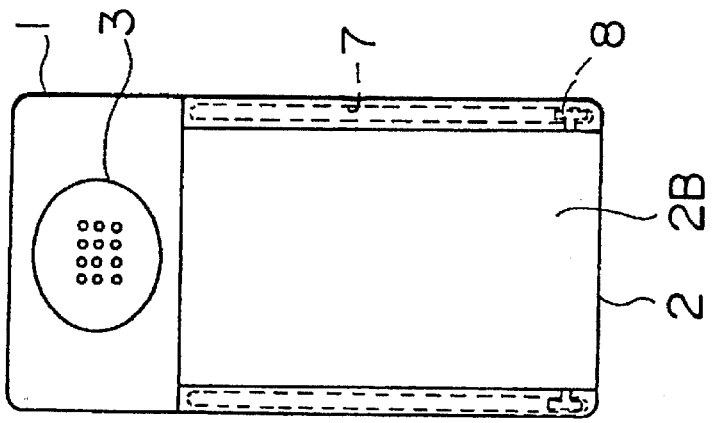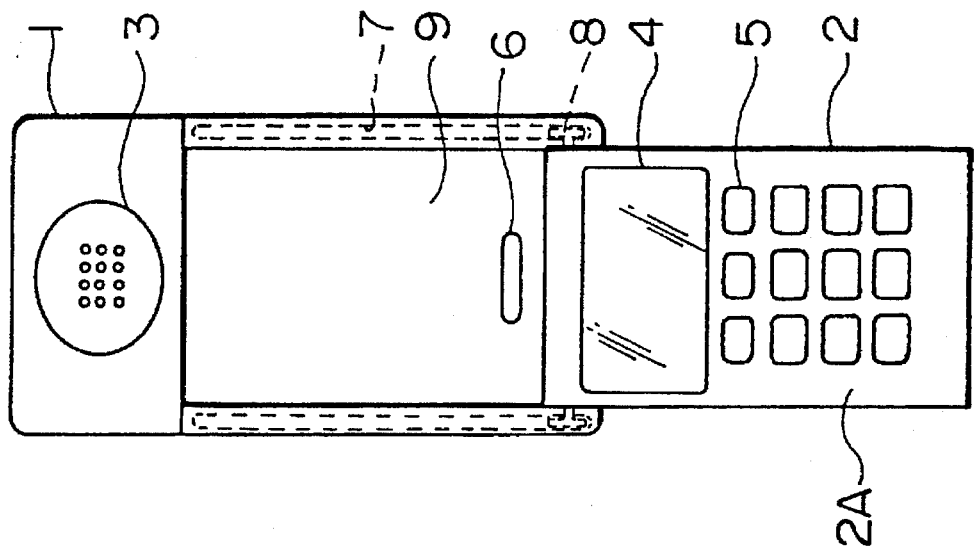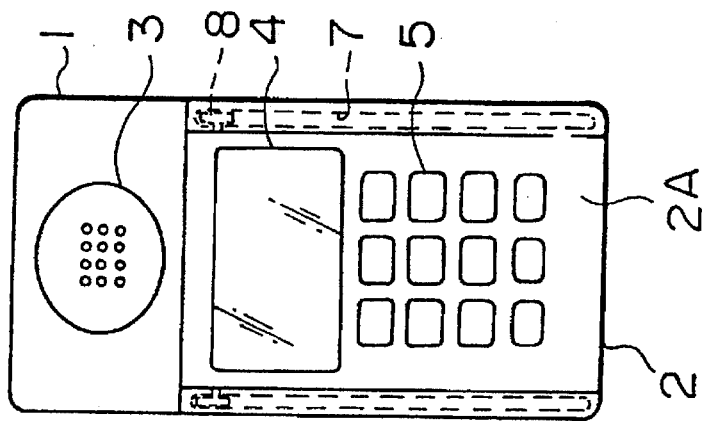

CELLULAR PORTABLE RADIOTELEPHONE

BACKGROUND OF THE INVENTION

1. Field of the Invention

The present invention relates to a communications device and, more particularly, to a cellular portable radiotelephone having improved operability.

2. Description of the Prior Art

In recent years, cellular portable radiotelephones are widely developed that transmit a signal, which is input in the form of a voice, to a telephone exchange in the form of a radio wave, and output a signal, which is received from the telephone exchange in the form of a radio wave, in the form of a voice.

A cellular portable radiotelephone of this type includes, in its housing, a telephone receiving section having a loudspeaker for converting an electric signal into a voice, and a telephone transmitting section having a microphone for converting a voice into an electric signal. A key operating section having a dialing function, an LCD display, and the like are also provided to the cellular portable radiotelephone.

In the conventional cellular portable radiotelephones, for example, one in which part of its housing is foldable (e.g., Japanese Unexamined Patent Publication No. 4-117848), one in which part of its housing is slidable (e.g., Japanese Unexamined Patent Publication No. 4-273744), and the like are proposed.

FIG. 1 is a perspective view of a conventional foldable cellular portable radiotelephone. In the cellular portable radiotelephone shown in FIG. 1, a telephone receiving section 23 is arranged in an upper housing 21, and a telephone transmitting section 24 and a key operating section 25 are disposed on a lower housing 22. The upper housing 21 and the lower housing 22 are pivotally coupled to each other through a hinge 26.

FIGS. 2A and 2B are plan and sectional views, respectively, showing a conventional slidable cellular portable radiotelephone. In the cellular portable radiotelephone shown in FIGS. 2A and 2B, a telephone receiving section 23 is arranged in an upper housing 21, and a telephone transmitting section 24 and a key operating section 25 are disposed in a lower housing 22. The lower housing 22 is coupled to the upper housing 21 to be slidable substantially parallel in directions indicated by a two-headed arrow in FIG. 2B.

In the conventional foldable cellular portable radiotelephone, the upper housing 21 and the lower housing 22 must be opened apart before operation, which is cumbersome. In the conventional slidable cellular portable radiotelephone, since the operation surface is always exposed to the outside, an erroneous operation of or damage to the device is likely to occur.

SUMMARY OF THE INVENTION

The present invention has been made in view of the above situations, and has as its object to provide a cellular portable radiotelephone excellent in operability and free from a cumbersome operation and the possibility of an erroneous operation or damage.

In order to achieve the above object, according to the first basic aspect of the present invention, there is provided a cellular portable radiotelephone comprising a first housing having at least a telephone receiving section, and a second housing slidably and pivotally mounted to the first housing and capable of being housed in the first housing, the second housing having a front surface, a rear surface serving as a slide surface to slide on the first housing, and a key operating section, wherein a display is disposed on the first housing, and a telephone transmitting section is disposed on the second housing.

In order to achieve the above object, according to the second basic aspect of the present invention, there is provided a cellular portable radiotelephone comprising a first housing having at least a telephone receiving section, and a second housing slidably and pivotally mounted to the first housing and capable of being housed in the first housing, the second housing having a front surface, a rear surface serving as a slide surface to slide on the first housing, and a key operating section, wherein a display and a telephone transmitting section are disposed on the second housing.

In order to achieve the above object, according to the third basic aspect of the present invention, there is provided a cellular portable radiotelephone comprising a first housing having a telephone transmitting section and a telephone receiving section, and a second housing slidably and pivotally mounted to the first housing and capable of being housed in the first housing, the second housing having a front surface, a rear surface serving as a slide surface to slide on the first housing, and a key operating section, wherein a display is disposed on the first housing.

In order to achieve the above object, according to the fourth basic aspect of the present invention, there is provided a cellular portable radiotelephone comprising a first housing having a telephone transmitting section and a telephone receiving section, and a second housing slidably and pivotally mounted to the first housing and capable of being housed in the first housing, the second housing having a front surface, a rear surface serving as a slide surface to slide on the first housing, and a key operating section, wherein a display is disposed on the second housing.

According to aspects based on the first and second embodiments of the present invention, there is provided a cellular portable radiotelephone wherein a telephone transmitting section of the first basic aspect is arranged on either the front or rear surface of the second housing.

According to aspects based on the third and fourth embodiments of the present invention, there is provided a cellular portable radiotelephone wherein a display and a telephone transmitting section of the second basic aspect are arranged on either the front or rear surface of the second housing.

Furthermore, according to still another aspect of the present invention, there is provided a cellular portable radiotelephone wherein another telephone transmitting section is further provided to either the rear or front surface of the second housing of any one of the first to fourth basic aspects.

As is apparent from the above aspects, the cellular portable radiotelephone according to the present invention comprises a first housing having at least a telephone receiving section, and a second housing slidably and pivotally mounted to the first housing and capable of being housed in the first housing, the second housing has a front surface, a rear surface serving as a slide surface to slide on the first housing, and a key operating section, a display is disposed on the first or second housing, and a telephone transmitting section is disposed on the front or rear surface of the second housing. Thus, when the second housing is slid and pivoted with respect to the first housing so that the second housing is housed in the first housing, a state wherein the operating surface is covered and protected, or a state wherein operation and telephone communication are possible can be selected in accordance with the use frequency or the preference of a user.

When another telephone transmitting section is provided to the front or rear surface of the second housing where a telephone transmitting section is not provided, the number of states wherein telephone communication is possible can be increased, thereby further improving the convenience for the user.

The above and other advantages, features, and additional objects of the present invention will become manifest to those versed in the art upon making reference to the following detailed description and accompanying drawings in which preferred embodiments incorporating the principle of the present invention are shown by way of illustrative example.

BRIEF DESCRIPTION OF THE DRAWINGS

FIGS. 2A and 2B are plan and side views, respectively, showing a conventional slidable cellular portable radiotelephone;

FIGS. 9A to 9C are plan views sequentially showing the operation procedures of a cellular portable radiotelephone according to the fifth embodiment of the present invention;

FIGS. 10A to 10C are plan views sequentially showing the operation procedures of a cellular portable radiotelephone according to the sixth embodiment of the present invention;

DETAILED DESCRIPTION OF PREFERRED EMBODIMENTS

The present invention will be described in detail by way of several preferred embodiments thereof shown in the accompanying drawings.

Figure 1:
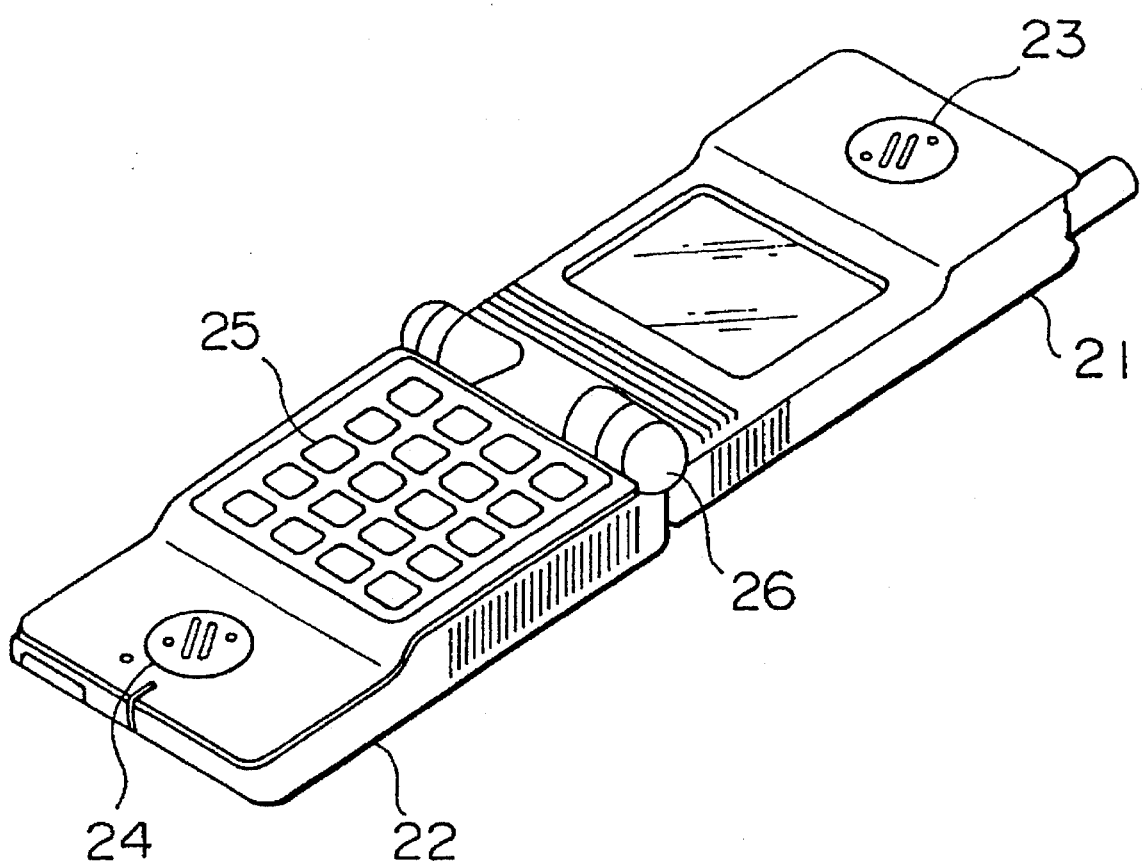
FIG. 1 is a perspective view of a conventional foldable cellular portable radiotelephone.
Figure 3A:
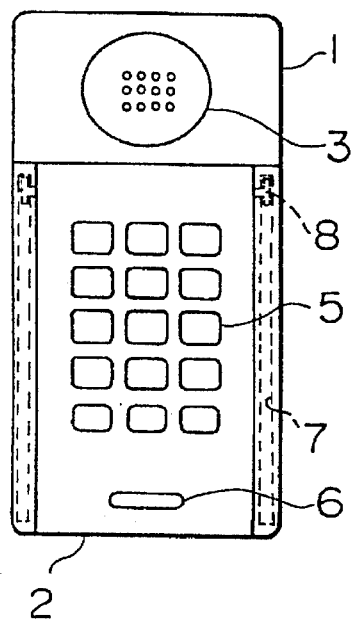
FIGS. 3A to 3C are plan views sequentially showing the operation procedures of a cellular portable radiotelephone according to the first embodiment of the present invention.
Figure 3B:
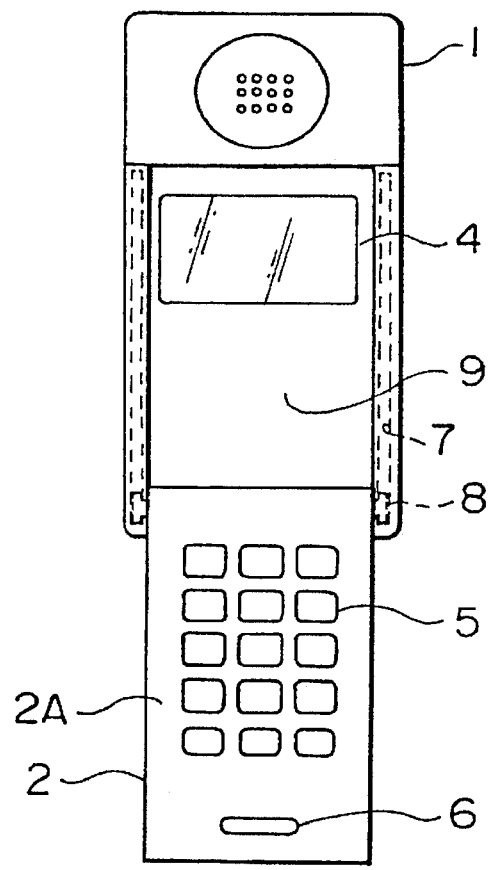
Figure 3C:
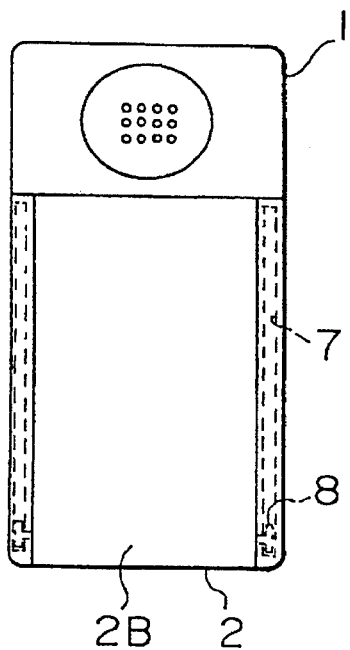
Figures 4A, 4B, 4C:
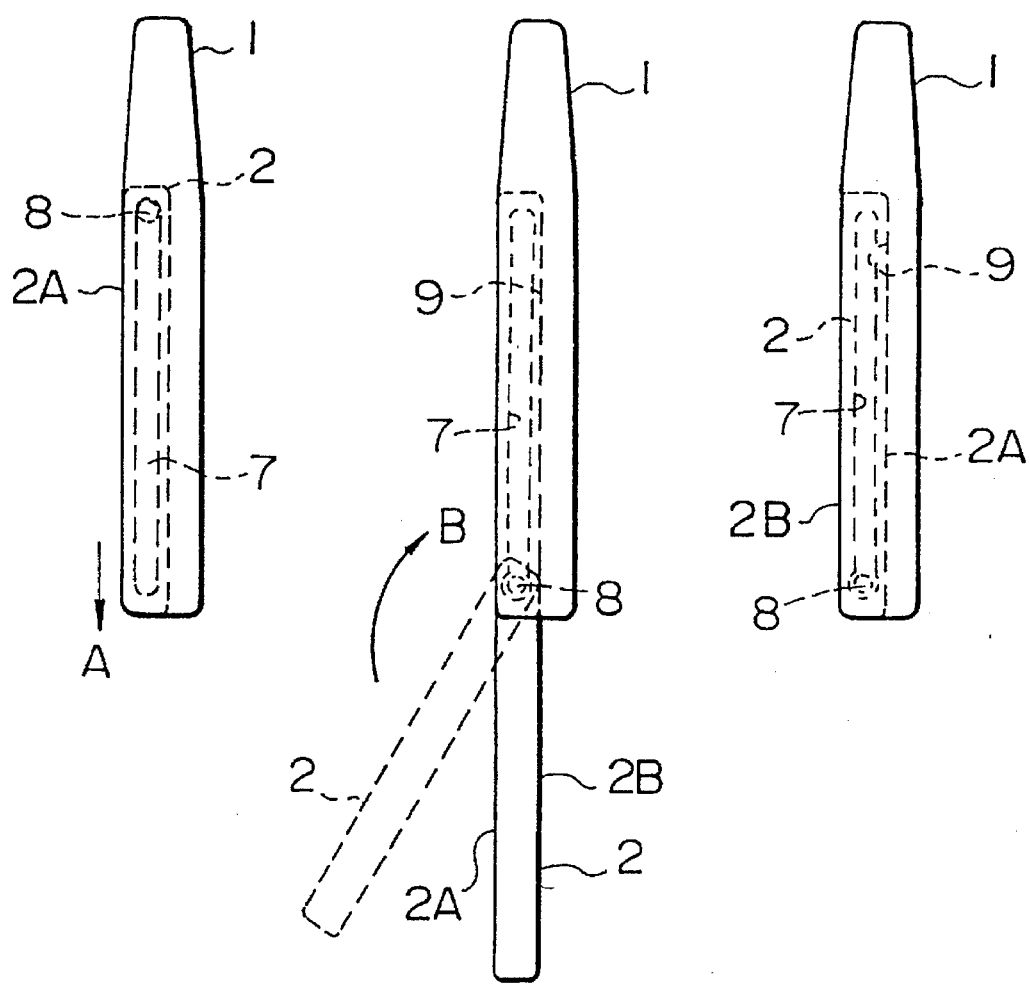
FIGS. 4A to 4C are side views corresponding to FIGS. 3A to 3C, respectively.
Figure 5:
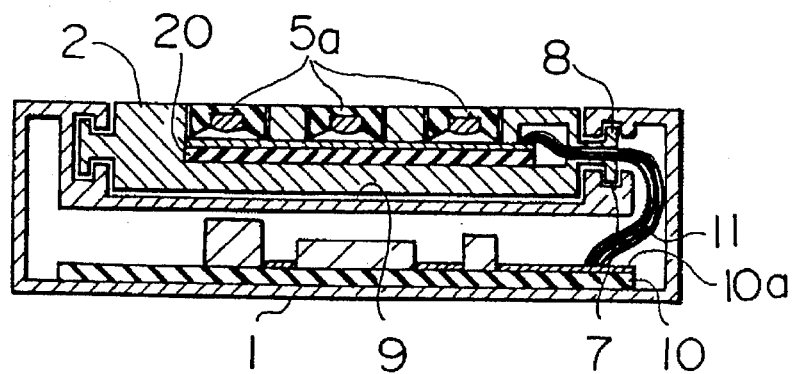
FIG. 5 is a sectional view showing the connected state of the first and second housings of the cellular portable radiotelephone according to the first embodiment of the present invention.

FIGS. 3A to 3C are plan views sequentially showing the operation procedures of a cellular portable radiotelephone according to the first embodiment of the present invention which corresponds to claim 2, and FIGS. 4A to 4C are side views respectively corresponding to FIGS. 3A to 3C. FIG. 5 is a sectional view showing the connected state of the first and second housings of the first embodiment of the present invention.

The housing of the first embodiment is constituted by a first housing 1 and a second housing 2. The connected state of the first and second housings 1 and 2 is as follows. In FIGS. 3A and 4A, the second housing 2 is housed in the first housing 1. From this state, sliders 8 fixed to the second housing 2 are slid along side grooves formed in the first housing 1, i.e., in guide grooves 7, in the direction indicated by an arrow A. At the slide terminal end, the second housing 2 is pivoted in the direction indicated by an arrow B in FIG. 4B so as to be turned in the first housing 1. In this manner, the second housing 2 is housed in the first housing 1 in two manners, as shown in FIGS. 3A and 3C (FIGS. 4A and 4C).

The first housing 1 has a telephone receiving section 3 and a recessed portion 9 for housing the second housing 2. A display 4 is provided in the recessed portion 9. The second housing 2 has a front surface 2A and a rear surface 2B serving as the slide surface to slide on the first housing 1. The front surface 2A has a key operating section and a telephone transmitting section 6. Telephone communication can be made in the states shown in FIGS. 3A and 3B and FIGS. 4A and 4B.

As is apparent from FIG. 5, the key operating section 5 provided to the second housing 2 comprises a plurality of keys 5a and a printed circuit board 20. The keys 5a are provided to be exposed on one surface of the second housing 2. The printed circuit board 20 is provided in the second housing 2 such that it can be operated by the keys 5a. The respective keys 5a of the key operating section 5 and the printed circuit board 20 are connected to a printed wiring portion 10a of a board 10 provided in the first housing 1 through wires 11 extending through a hole formed in the central portion of one slider 8. Various types of devices (not shown) required for signal transmission, signal reception, and display are provided to the board 10.

Figure 6A:
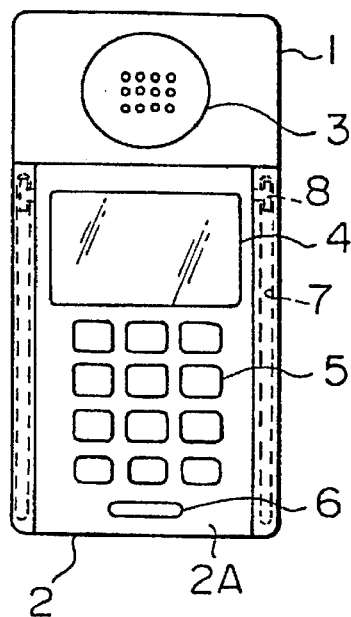
FIGS. 6A to 6C are plan views sequentially showing the operation procedures of a cellular portable radiotelephone according to the second embodiment of the present invention.
Figure 6B:
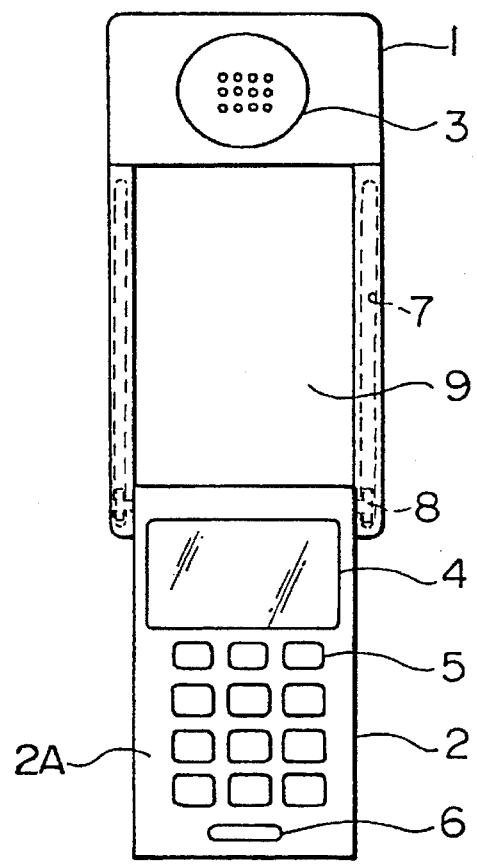
Figure 6C:
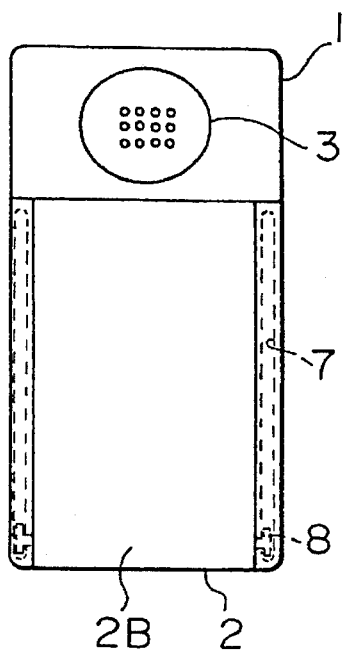

FIGS. 6A to 6C are plan views sequentially showing the operation procedures of a cellular portable radiotelephone according to the second embodiment of the present invention which corresponds to claim 5.

The structure of the housing of the second embodiment is identical to that of the first embodiment, and a second housing 2 is housed in a first housing 1 in two manners shown in FIGS. 6A and 6C. In the second embodiment, the first housing 1 has a telephone receiving section 3. The second housing 2 has a front surface 2A and a rear surface 2B serving as the slide surface to slide on the first housing 1. The front surface 2A has a key operating section 5, a telephone transmitting section 6, and a display 4. Telephone communication can be made in the states shown in FIGS. 6A and 6B.

Figure 7A:
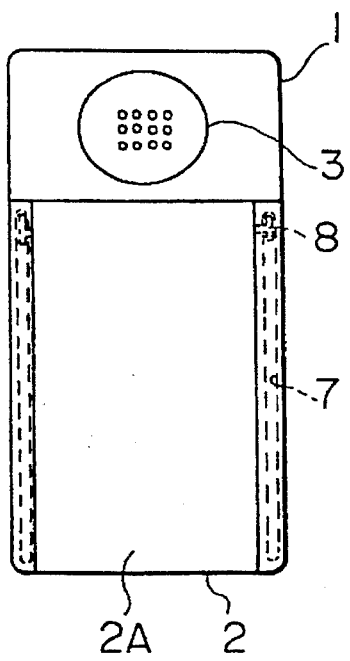
FIGS. 7A to 7C are plan views sequentially showing the operation procedures of a cellular portable radiotelephone according to the third embodiment of the present invention.
Figure 7B:
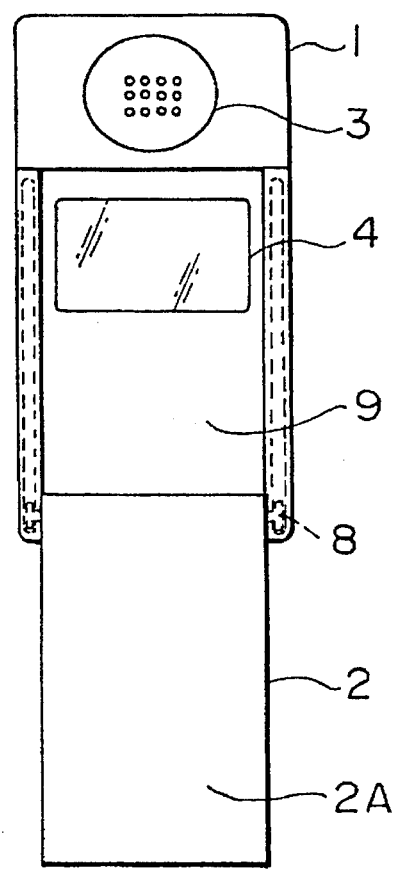
Figure 7C:
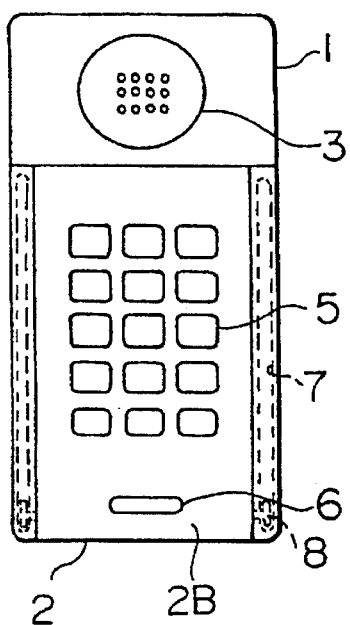

FIGS. 7A to 7C are plan views sequentially showing the operation procedures of a cellular portable radiotelephone according to the third embodiment of the present invention which corresponds to claim 3.

The structure of the housing of the third embodiment is identical to those of the above embodiments, and a second housing 2 is housed in a first housing 1 in two manners shown in FIGS. 7A and 7C. In the third embodiment, the first housing 1 has a telephone receiving section 3, and a display 4 provided to its recessed portion 9. The second housing 2 has a front surface 2A and a rear surface 2B serving as the slide surface to slide on the first housing 1. The rear surface 2B has a key operating section 5 and a telephone transmitting section 6. Telephone communication can be made in the state shown in FIG. 7C.

Figure 8A:
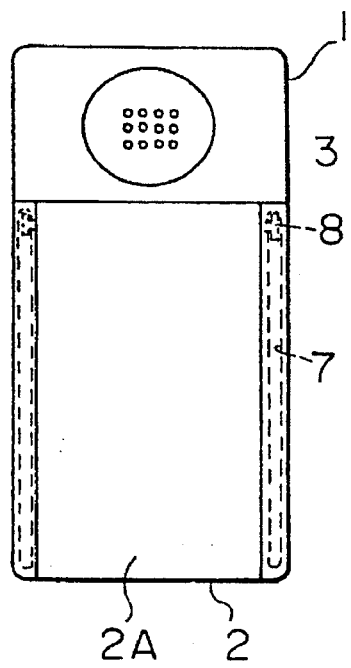
FIGS. 8A to 8C are plan views sequentially showing the operation procedures of a cellular portable radiotelephone according to the fourth embodiment of the present invention.
Figure 8B:
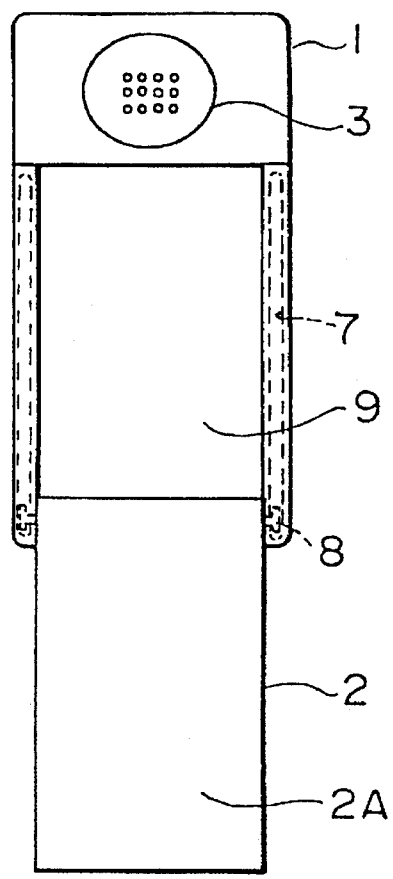
Figure 8C:
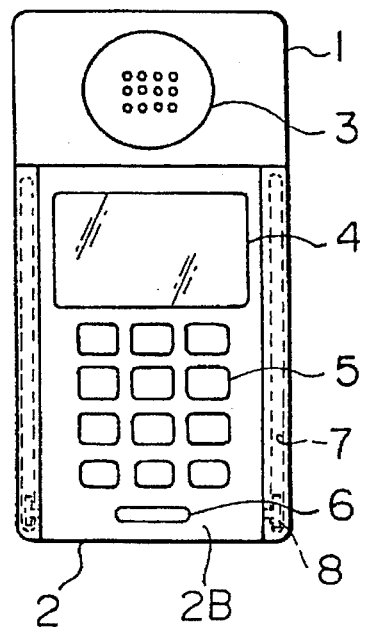

FIGS. 8A to 8C are plan views sequentially showing the operation procedures of a cellular portable radiotelephone according to the fourth embodiment of the present invention which corresponds to claim 6.

The structure of the housing of the fourth embodiment is identical to those of the above embodiments, and a second housing 2 is housed in a first housing 1 in two manners shown in FIGS. 8A and 8C. In the fourth embodiment, the first housing 1 has a telephone receiving section 3. The second housing 2 has a front surface 2A and a rear surface 2B serving as the slide surface to slide on the first housing 1. The rear surface 2B has a display 4, a key operating section 5, and a telephone transmitting section 6. Telephone communication can be made in the state shown in FIG. 8C.

FIGS. 9A to 9C are plan views sequentially showing the operation procedures of a cellular portable radiotelephone according to the fifth embodiment of the present invention which corresponds to claim 11.

The structure of the housing of the fifth embodiment is identical to those of the above embodiments, and a second housing 2 is housed in a first housing 1 in two manners shown in FIGS. 9A and 9C. In the fifth embodiment, the first housing 1 has a telephone receiving section 3, and a display 4 and a telephone transmitting section 6 provided to its recessed portion 9. The second housing 2 has a front surface 2A and a rear surface 2B serving as the slide surface to slide on the first housing 1. The front surface 2A has a key operating section 5. Telephone communication can be made in the state shown in FIG. 9B.

FIGS. 10A to 10C are plan views sequentially showing the operation procedures of a cellular portable radiotelephone according to the sixth embodiment of the present invention which corresponds to claim 13.

The structure of the housing of the sixth embodiment is identical to those of the above embodiments, and a second housing 2 is housed in a first housing 1 in two manners shown in FIGS. 10A and 10C. In the sixth embodiment, the first housing 1 has a telephone receiving section 3 and a telephone transmitting section 6 which is provided to its recessed portion 9. The second housing 2 has a front surface 2A and a rear surface 2B serving as the slide surface to slide on the first housing 1. The front surface 2A has a display 4 and a key operating section 5. Telephone communication can be made in the state shown in FIG. 10B.

Figure 11C:
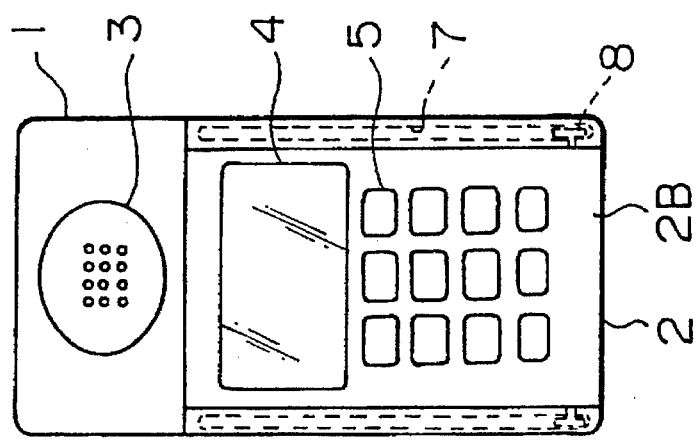
FIGS. 11A to 11C are plan views sequentially showing the operation procedures of a cellular portable radiotelephone according to the seventh embodiment of the present invention.
Figure 11B:
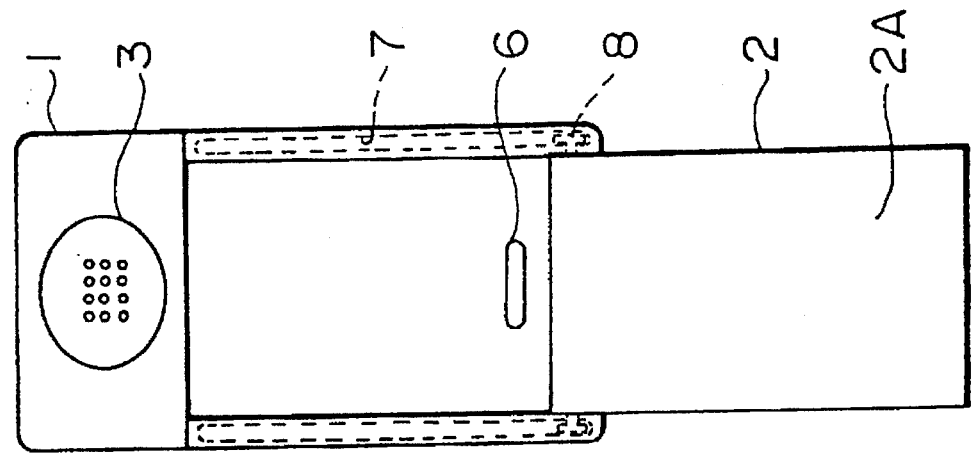
Figure 11A:
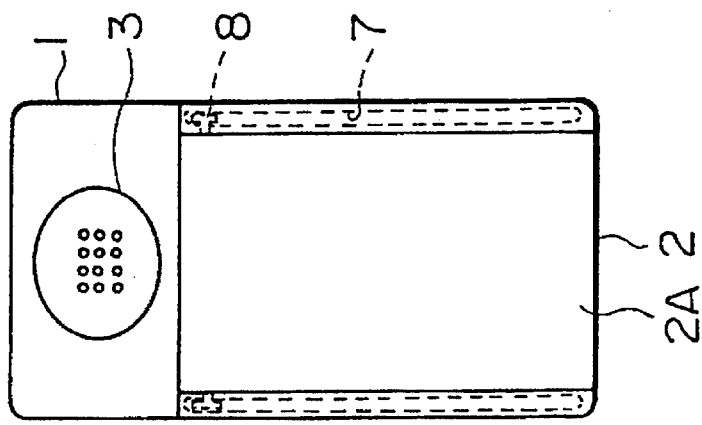

FIGS. 11A and 11C are plan views sequentially showing the operation procedures of a cellular portable radiotelephone according to the seventh embodiment of the present invention which corresponds to claim 14.

The structure of the housing of the seventh embodiment is identical to those of the above embodiments, and a second housing 2 is housed in a first housing 1 in two manners shown in FIGS. 11A and 11C. In the seventh embodiment, the first housing 1 has a telephone receiving section 3 and a telephone transmitting section 6 which is provided to its recessed portion 9. The second housing 2 has a front surface 2A and a rear surface 2B serving as the slide surface to slide on the first housing 1. The rear surface 2B has a display 4 and a key operating section 5. Telephone communication can be made in the state shown in FIG. 11B.

FIGS. 3D, 6D, 7D, 8D, 9D, 9E, 10D, 10E, 11D, and 11E are plan views showing modifications (further provided with other telephone transmitting sections) of the first to seventh embodiments described above.

Figure 3D:
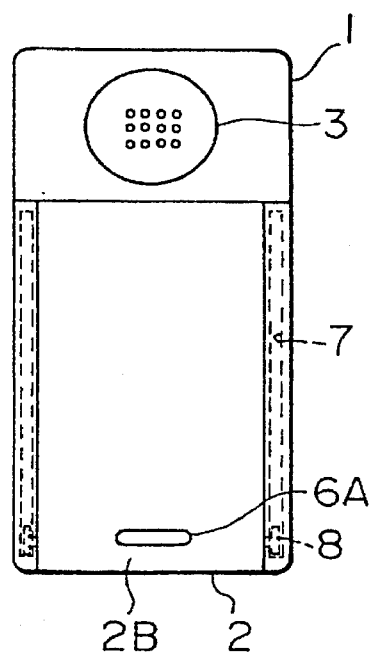
FIG. 3D is a plan view showing a modification of the first embodiment.

FIG. 3D is a plan view showing a modification of the first embodiment shown in FIGS. 3A to 3C. This modification corresponds to claim 7, in which another telephone transmitting section 6A is provided to the rear surface 2B of the second housing 2 of the first embodiment. With this modification in the first embodiment, telephone communication can be made in the state shown in FIG. 3D as well.

Figure 6D:
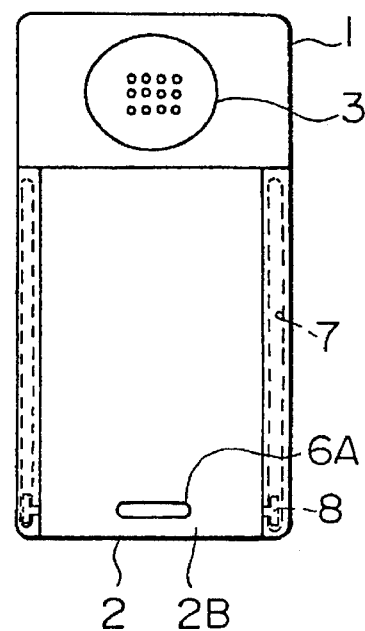
FIG. 6D is a plan view showing a modification of the second embodiment.

FIG. 6D is a plan view showing a modification of the second embodiment shown in FIGS. 6A to 6C. This modification corresponds to claim 8, in which another telephone transmitting section 6A is provided to the rear surface 2B of the second housing 2 of the second embodiment. With this modification in the second embodiment, telephone communication can be made in the state shown in FIG. 6D as well.

Figure 7D:
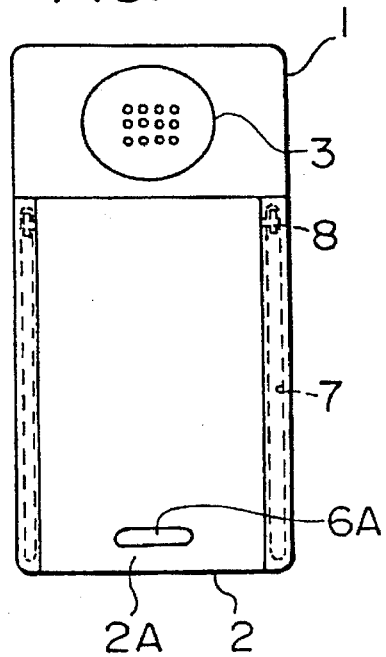
FIG. 7D is a plan view showing a modification of the third embodiment.

FIG. 7D is a plan view showing a modification of the third embodiment shown in FIGS. 7A to 7C. This modification corresponds to claim 9, in which another telephone transmitting section 6A is provided to the front surface 2A of the second housing 2 of the third embodiment. With this modification in the third embodiment, telephone communication can be made in the state shown in FIG. 7D as well.

Figure 8D:
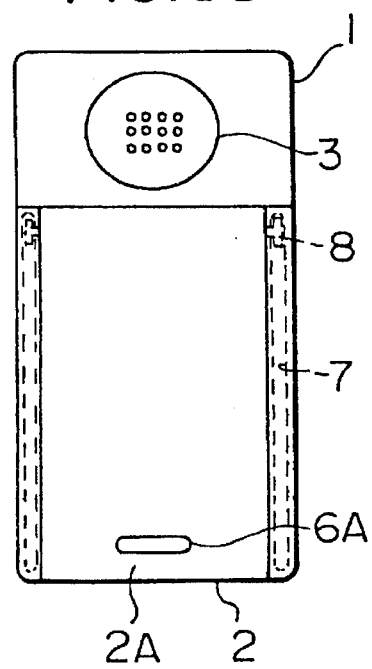
FIG. 8D is a plan view showing a modification of the fourth embodiment.

FIG. 8D is a plan view showing a modification of the fourth embodiment shown in FIGS. 8A to 8C. This modification corresponds to claim 10, in which another telephone transmitting section 6A is provided to the front surface 2A of the second housing 2 of the fourth embodiment. With this modification in the fourth embodiment, telephone communication can be made in the state shown in FIG. 8D as well.

Figure 9D:
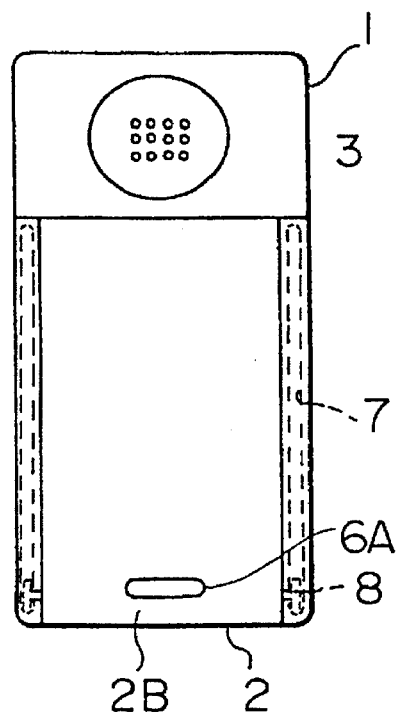
FIG. 9D is a plan view showing the first modification of the fifth embodiment.

FIG. 9D is a plan view showing the first modification of the fifth embodiment shown in FIGS. 9A to 9C. This modification corresponds to claim 15, in which another telephone transmitting section 6A is provided to the rear surface 2B of the second housing 2 of the fifth embodiment. With this modification in the fifth embodiment, telephone communication can be made in the state shown in FIG. 9D as well.

Figure 9E:
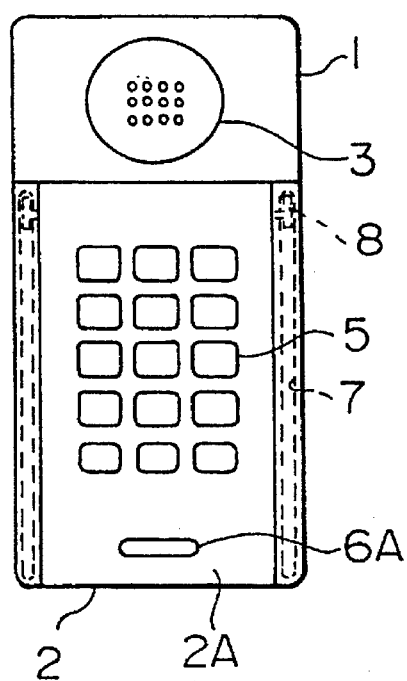
FIG. 9E is a plan view showing the second modification of the fifth embodiment.

FIG. 9E is a plan view showing the second modification of the fifth embodiment shown in FIGS. 9A to 9C. This modification corresponds to claim 18, in which another telephone transmitting section 6A is provided to the front surface 2A of the second housing 2 of the fifth embodiment. With this modification in the fifth embodiment, telephone communication can be made in the state shown in FIG. 9E as well.

Figure 10D:
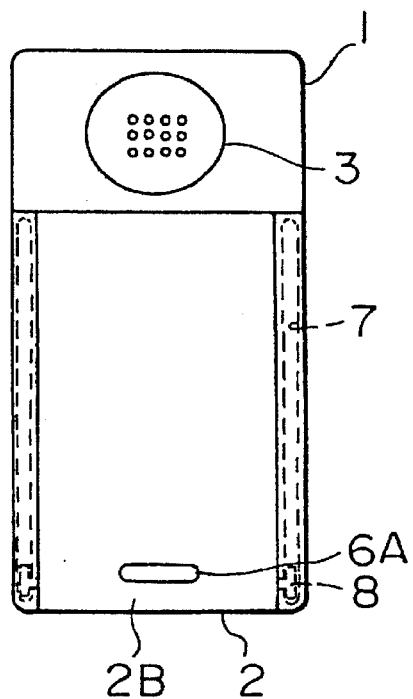
FIG. 10D is a plan view showing the first modification of the sixth embodiment.

FIG. 10D is a plan view showing the first modification of the sixth embodiment shown in FIGS. 10A to 10C. This modification corresponds to claim 16, in which another telephone transmitting section 6A is provided to the rear surface 2B of the second housing 2 of the sixth embodiment. With this modification in the sixth embodiment, telephone communication can be made in the state shown in FIG. 10D as well.

Figure 10E:
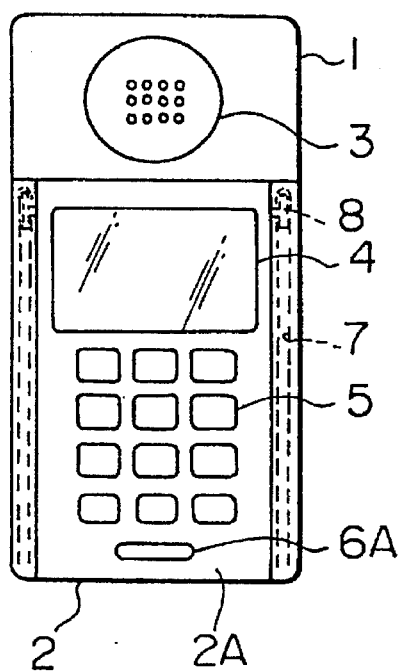
FIG. 10E is a plan view showing the second modification of the sixth embodiment.

FIG. 10E is a plan view showing the second modification of the sixth embodiment shown in FIGS. 10A to 10C. This modification corresponds to claim 19, in which another telephone transmitting section 6A is provided to the front surface 2A of the second housing 2 of the sixth embodiment. With this modification in the sixth embodiment, telephone communication can be made in the state shown in FIG. 10E as well.

Figure 11D:
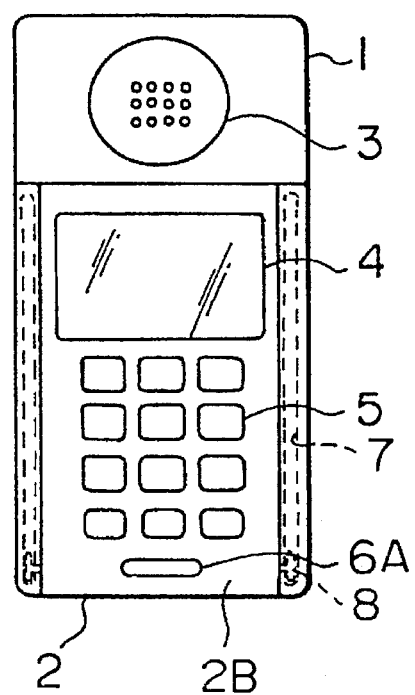
FIG. 11D is a plan view showing the first modification of the seventh embodiment.

FIG. 11D is a plan view showing the first modification of the seventh embodiment shown in FIGS. 11A to 11C. This modification corresponds to claim 17, in which another telephone transmitting section 6A is provided to the rear surface 2B of the second housing 2 of the seventh embodiment. With this modification in the seventh embodiment, telephone communication can be made in the state shown in FIG. 11D as well.

Figure 11E:
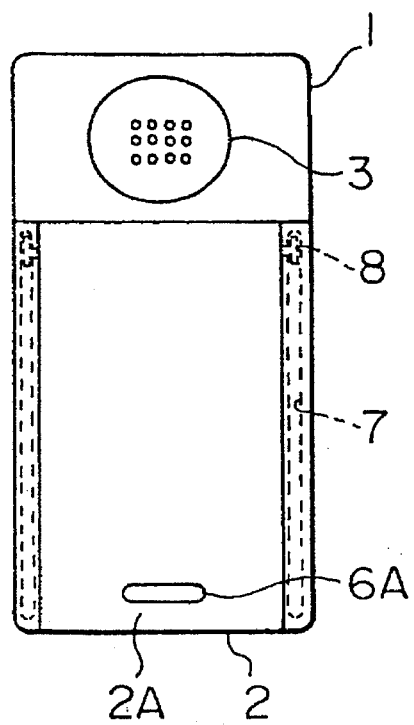
FIG. 11E is a plan view showing the second modification of the seventh embodiment.

FIG. 11E is a plan view showing the second modification of the seventh embodiment shown in FIGS. 11A to 11C. This modification corresponds to claim 20, in which another telephone transmitting section 6A is provided to the front surface 2A of the second housing 2 of the seventh embodiment. With this modification in the seventh embodiment, telephone communication can be made in the state shown in FIG. 11E as well.

What is claimed is:

1. A cellular portable radiotelephone comprising a first housing having at least a telephone receiving section, and a second housing linearly slidably and pivotally mounted to said first housing and capable of being housed in said first housing, said second housing having a front surface, a rear surface serving as a slide surface to slide on said first housing, and a key operating section, wherein a display is disposed on said first housing, and a telephone transmitting section is disposed on said second housing, wherein said second housing may be housed in said first housing in one of a first and a second position, said first position being with said front surface facing said first housing, said second position being with said rear surface facing said first housing.

2. A radiotelephone according to claim 1, wherein said telephone transmitting section is disposed on said front surface of said second housing.

3. A radiotelephone according to claim 1, wherein said telephone transmitting section is disposed on said rear surface of said second housing.

4. A cellular portable radiotelephone comprising a first housing having at least a telephone receiving section, and a second housing linearly slidably and pivotally mounted to said first housing and capable of being housed in said first housing, said second housing having a front surface, a rear surface serving as a slide surface to slide on said first housing, and a key operating section, wherein a display and a telephone transmitting section are disposed on said second housing, wherein said second housing may be housed in said first housing in one of a first and a second position, said first position being with said front surface facing said first housing, said second position being with said rear surface facing said first housing.

5. A radiotelephone according to claim 4, wherein said display and said telephone transmitting section are disposed on said front surface of said second housing.

6. A radiotelephone according to claim 4, wherein said display and said telephone transmitting section are disposed on said rear surface of said second housing.

7. A radiotelephone according to claim 2, wherein another telephone transmitting section is further disposed on said rear surface of said second housing.

8. A radiotelephone according to claim 3, wherein another telephone transmitting section is further disposed on said front surface of said second housing.

9. A radiotelephone according to claim 5, wherein another telephone transmitting section is further disposed on said rear surface of said second housing.

10. A radiotelephone according to claim 6, wherein another telephone transmitting section is further disposed on said front surface of said second housing.

11. A cellular portable radiotelephone comprising a first housing having a telephone transmitting section and a telephone receiving section, and a second housing linearly slidably and pivotally mounted to said first housing and capable of being housed in said first housing, said second housing having a front surface, a rear surface serving as a slide surface to slide on said first housing, and a key operating section, wherein a display is disposed on said first housing, wherein said second housing may be housed in said first housing in one of a first and a second position, said first position being with said front surface facing said first housing, said second position being with said rear surface facing said first housing.

12. A cellular portable radiotelephone comprising a first housing having a telephone transmitting section and a telephone receiving section, and a second housing linearly slidably and pivotally mounted to said first housing and capable of being housed in said first housing, said second housing having a front surface, a rear surface serving as a slide surface to slide on said first housing, and a key operating section, wherein a display is disposed on said second housing, wherein said second housing may be housed in said first housing in one of a first and a second position, said first position being with said front surface facing said first housing, said second position being with said rear surface facing said first housing.

13. A radiotelephone according to claim 12, wherein said display is disposed on said front surface of said second housing.

14. A radiotelephone according to claim 12, wherein said display is disposed on said rear surface of said second housing.

15. A radiotelephone according to claim 11, wherein another telephone transmitting section is further disposed on said rear surface of said second housing.

16. A radiotelephone according to claim 13, wherein another telephone transmitting section is further disposed on said rear surface of said second housing.

17. A radiotelephone according to claim 14, wherein another telephone transmitting section is further disposed on said rear surface of said second housing.

18. A radiotelephone according to claim 11, wherein another telephone transmitting section is further disposed on said front surface of said second housing.

19. A radiotelephone according to claim 13, wherein another telephone transmitting section is further disposed on said front surface of said second housing.

20. A radiotelephone according to claim 14, wherein another telephone transmitting section is further disposed on said front surface of said second housing.

* * * * *